April 1, 1924.  R. L. VOSBURGH  1,488,958
WATER HEATER
Filed Sept. 20, 1922    2 Sheets-Sheet 1

INVENTOR
Raymond L. Vosburgh
by
Owen Crown Crampton

April 1, 1924.
R. L. VOSBURGH
WATER HEATER
Filed Sept. 20, 1922  2 Sheets-Sheet 2
1,488,958
Fig 3
Fig 4
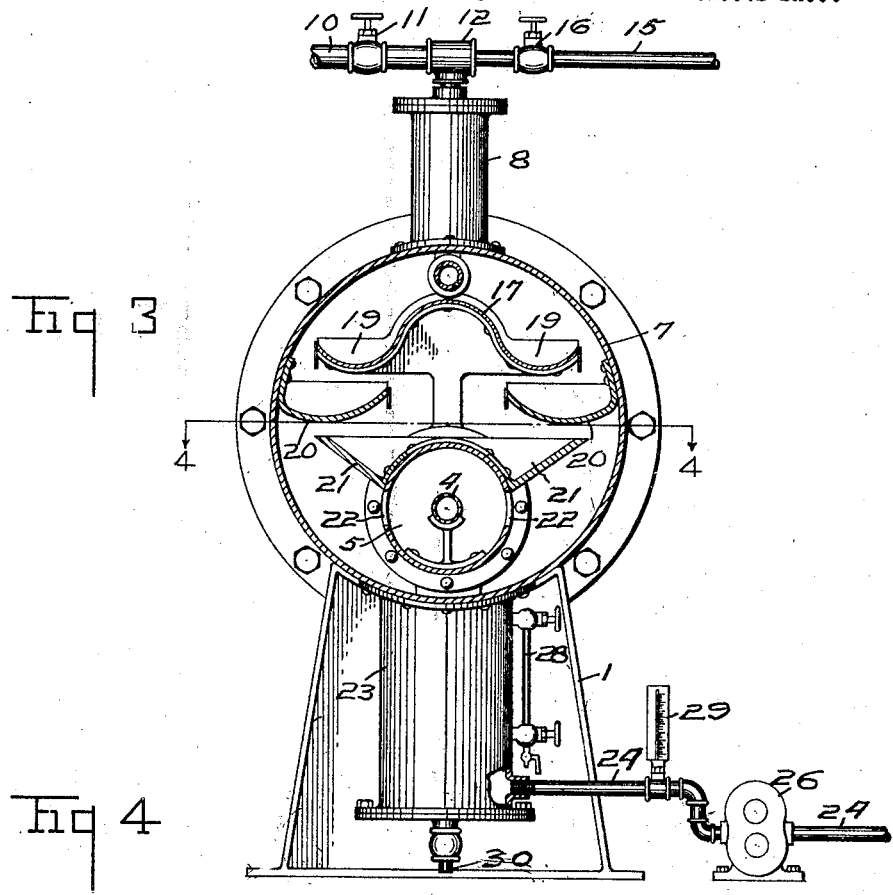
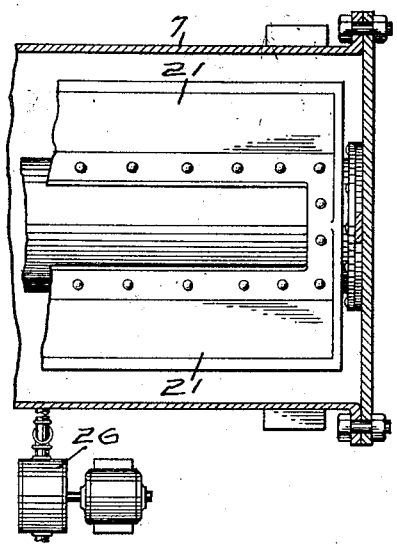
INVENTOR
Raymond L. Vosburgh,
by
Owen, Owen & Crampton Patented Apr. 1, 1924.

1,488,953

UNITED STATES PATENT OFFICE.

RAYMOND L. VOSBURGH, OF TOLEDO, OHIO.

WATER HEATER.

Application filed September 20, 1922. Serial No. 589,386.

*To all whom it may concern:*

Be it known that I, RAYMOND L. VOSBURGH, a citizen of the United States, and a resident of Toledo, in the county of Lucas and State of Ohio, have made an Invention Appertaining to a Water Heater; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a water heater particularly to be used in connection with water heating systems for heating rooms, such as for domestic and other purposes, and wherein the water is heated by being brought into direct contact with the heated gases produced by the fuel. The invention provides a means for distributing the water so that the flame and heated gases from the fuel will be brought into direct contact with the surface of the water. It particularly provides for the falling of water through the combustion chamber of a burning fuel. In embodiments of my invention a variety of forms of furnaces may be used, and the fuel may be of any character. Gas or oil, or even coal may be used as the fuel for heating the water.

The invention may be contained in structures of different forms. To illustrate a practical application of the invention I have selected one of the structures containing the invention as an example of such structures. The structure selected is illustrated in the accompanying drawings and is described hereinafter.

Figure 1:
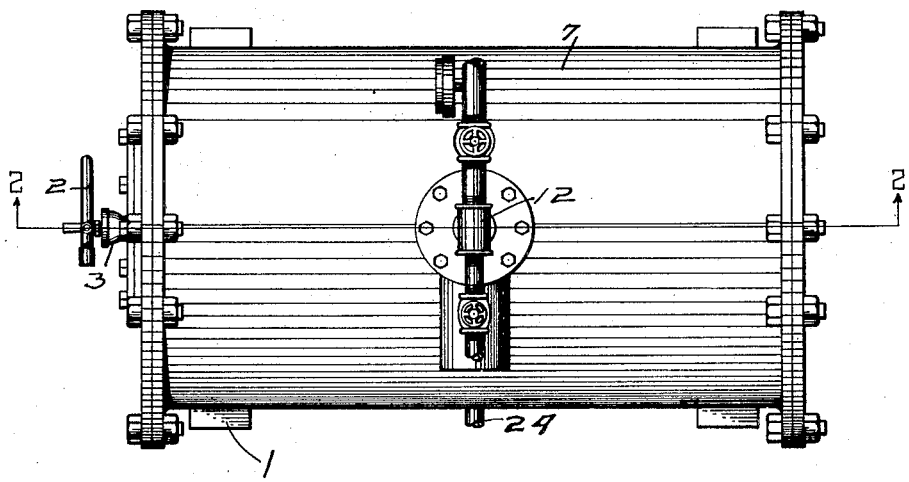
Figure 2:
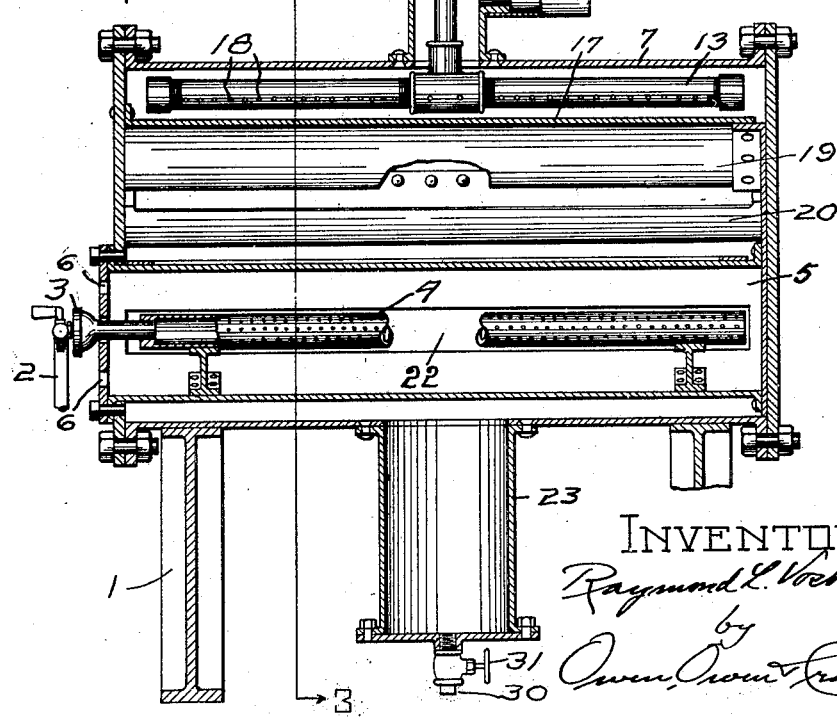

Figure 1 of the drawings is a top view of the water heater. Fig. 2 is a sectional view taken on the line 2—2 indicated in Fig. 1. Fig. 3 is a sectional view taken on the line 3—3 indicated in Fig. 2. Fig. 4 is a sectional view taken on the line 4—4 indicated in Fig. 3.

In the figures, 1 indicates the supporting structure or base of the water heater. A source of fuel supply is connected through the pipe 2. This may be oil under pressure or gas or other suitable material. A mixer 3 is connected to the burner 4 which is located in the fuel chamber 5. One end of the fuel chamber 5 may be provided with openings 6 through which air may pass into the chamber. The chamber 5 is located in the drum 7, and an outlet 8 for the burnt gases is secured to the top of the drum 7. The outlet 8 is connected by means of a suitable pipe 9 to the chimney.

The water main from which the water is admitted to the heater system, is connected to the heater by means of the pipe 15. The admission of the water is controlled by the valve 16 located in the pipe 15. The valve 15 is opened when a certain amount of the water has leaked out of the system and so as to maintain the proper quantity of the water in the system. The pipe 15 communicates with a T connector 12 to which is also connected the distributor 13 through the pipe 14. When sufficient water for the supply of the system has been obtained from the water main the valve 16 is closed. The return from the system is through the pipe 10 which is controlled by a suitable valve, such as the valve 11. The pipe 15 is also connected to the distributor 13 through the connector 12 and pipe 14.

The distributor 13 is located within the drum 7 and extends over a bridge 17 located within the drum 7 and extending from one end to the other. The bridge directs the water from the distributor 13, which is provided with a plurality of openings 18, to the troughs 19 located on opposite sides of the bridge. The outer edges of the troughs extend to near the cylindrical wall of the drum 7. The troughs 19 are located above the troughs 20 and so as to form baffles not only as to the overflowing water from the troughs 19, but also as to the heated or partially consumed products of the combustion from the fuel. The troughs 20 extend inward from the cylindrical wall of the drum and may be supported on the cylindrical wall. Above the fuel chamber 5 is located a pair of troughs 21 which also operate to baffle the falling water and the gases from the fuel chamber 5. Water in passing through the heater thus distributes itself over the bridge 17, part falling into each of the troughs 19. From thence it falls to the troughs 20, and again falls over the edges of the troughs 20 into the troughs 21, and again from the troughs 21 to the lower part of the cylinder. The chamber 5 is provided with openings 22 that are located below the lower side and in proximity to the troughs 21. The flame and the heated gases pass out through the openings 22 and pass over the surface of the falling water, and through the water, and upwards to the chimney through the passageway afforded by the pipe 9. The water collects or is received in the drum 23 from whence it passes to the heating system through the pipe 24. The circulation of the water may be produced by the pump 26 which causes the water to flow through the pipe 24, the radiators and other heating devices that may be used in the system. The water returns through the pipe 10 and so completes the circuit to the heater.

Suitable gauges, such as the gauge 27, may be used for indicating the pressure. The water gauge 28 may be used for indicating the level of the water in the tank or drum 23. Also a thermometer 29 may be used for indicating the temperature of the water to be drawn from the heater. Other suitable regulating devices may be used, such as safety valves, floats and pipe valves for regulating the flow and the outlets of the system.

The device thus provides an exceedingly efficient water heater, since the flame from the burner comes in direct contact with the water and the falling water passes through the hot gases produced in the combustion of the fuel, with the result that practically all the heat units are utilized in the heating of the water.

I claim:

1. In a water heater, a pair of troughs connected by a bridge, a second pair of troughs located below the first named pair, a third pair of troughs located below the second pair of troughs, a fuel chamber located below the second pair of troughs, a water distributor located above the bridge, the troughs so located as to baffle the flow of the water from the distributor and the products of combustion from the fuel chamber.

2. In a water heater, a pair of troughs connected by a bridge, a second pair of troughs located below the first named pair, a third pair of troughs located below the second pair of troughs, a fuel chamber located below the second pair of troughs, a water distributor located above the bridge, the troughs so located as to baffle the flow of the water from the distributor and the products of combustion from the fuel chamber, a pump for circulating the water through the heater and the system.

In testimony whereof, I have hereunto signed my name to this specification.

RAYMOND L. VOSBURGH